United States Patent [19]

Karayannis et al.

[11] 4,015,060
[45] Mar. 29, 1977

[54] CATALYST AND PROCESS FOR THE POLYMERIZATION OF OLEFINS

[75] Inventors: Nicholas M. Karayannis, Hinsdale; James A. Turner, Naperville; Sam S. Lee, Hoffman Estates, all of Ill.

[73] Assignee: Standard Oil Company, Chicago, Ill.

[22] Filed: Nov. 8, 1971

[21] Appl. No.: 196,335

[52] U.S. Cl. .......................... 526/141; 252/429 B; 526/351

[51] Int. Cl.² ..................... C08F 4/66; C08F 10/06

[58] Field of Search ................. 252/429 B, 429 C; 260/93.7, 94.9 C, 94.9 E; 526/141

[56] References Cited

UNITED STATES PATENTS

| | | | |
|---|---|---|---|
| 3,116,274 | 12/1963 | Boehm et al. | 260/94.9 C |
| 3,240,773 | 3/1966 | Boor | 260/94.9 C |
| 3,405,107 | 10/1968 | Matthews et al. | 260/94.9 C |

FOREIGN PATENTS OR APPLICATIONS

| | | | |
|---|---|---|---|
| 4,420,098 | 8/1969 | Japan | 260/94.9 C |
| 885,869 | 12/1961 | United Kingdom | 260/94.9 E |
| 921,954 | 3/1963 | United Kingdom | |

*Primary Examiner*—Edward J. Smith
*Attorney, Agent, or Firm*—Reed F. Riley; Arthur G. Gilkes; William T. McClain

[57] ABSTRACT

Disubstituted heterocyclic amine oxides substituted alpha, alpha'. to the N atom have been found to markedly reduce production of alkane-soluble components formed during the polymerization of propylene and its mixtures with titanium chloride-organoaluminum catalyst.

1 Claim, 1 Drawing Figure

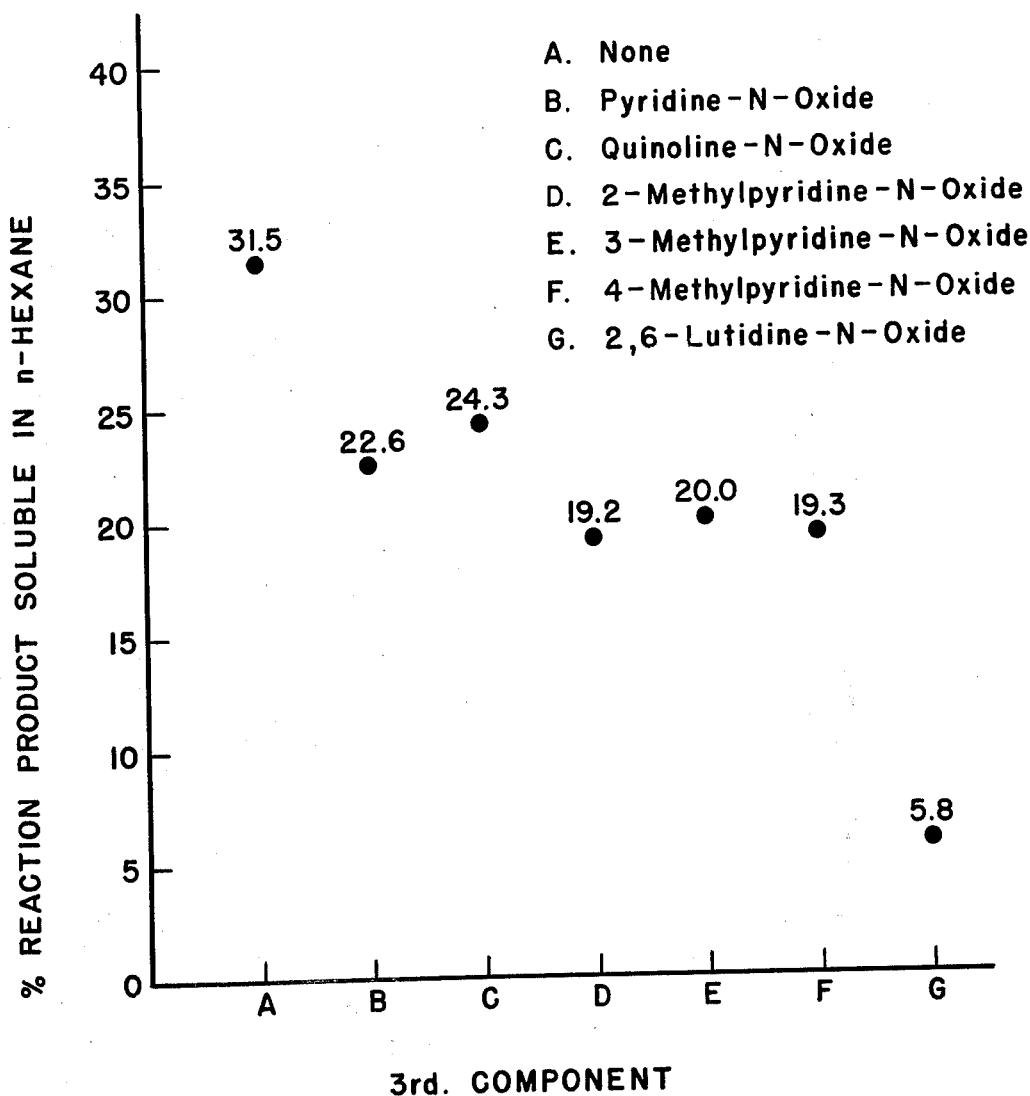

CATALYST AND PROCESS FOR THE POLYMERIZATION OF OLEFINS

SUMMARY OF THE INVENTION

This invention relates to a novel catalyst and process for the polymerization of terminal olefins to produce normally solid crystalline polymers and more specifically to a novel catalyst and process for polymerization of alpha-olefins which produces in excellent yields normally-solid, crystalline polymeric products wherein coproduced low-molecular-weight and amorphous polymers are substantially reduced.

In accordance with the instant invention, alpha-olefins are polymerized to normally solid polymers at atmospheric pressure and above and at moderate temperatures with a catalyst system comprising: (a) a trialkyl aluminum compound or an alkyl aluminum halide or mixtures thereof, (b) a halide of a metal belonging to Groups IV B to VI B, inclusive, of the Periodic Table, and (c) a sterically hindered heterocyclic amine oxide. The polymeric products produced using the above described catalyst can have low-molecular-weight and amorphous components, as measured by extraction using n-hexane, of as little as 1 percent of the total polymer yield.

BACKGROUND OF THE INVENTION

Polymers of alpha-olefins prepared in the presence of heterogeneous catalyst systems, as for example, polypropylene prepared using a catalyst comprised of diethyl aluminum chloride and titanium trichloride, contain greater or lesser amounts of low-molecular-weight and amorphous components which, when taken alone, are viscous oils or soft, tacky solids. The presence of these alkane-soluble materials in the polymers leads to difficulties during their fabrication and to inferior physical properties of the finished item, and hence are almost always removed in commerical processes for the production of polypropylene.

In the past tertiary amine oxides, U.S. Pat. No. 3,288,773, have been reported as useful (c) components, supra, to reduce the alkane-soluble fraction produced during the polymerization process. Also, in British Pat. No. 1,000,348 heterocyclic amines and amine oxides are suggested for use as the (c) component of a catalyst system to obtain polymeric products of "unusually high crystallinity". So, too, in British Pat. No. 921,954 tertiary amine oxides and heterocyclic amine oxides are claimed as polymerization process additives to increase the crystalline polypropylene made using a process involving a Ziegler-type polymerization catalyst. In none of the above referred to patents, however, has the additive been claimed to reduce the alkane-soluble polymers to a point where no extraction would be necessary in the commercial process while still maintaining a commercially feasible yield of crystalline polymer. A polymer product containing about 2 percent or less of n-hexane soluble polymer would not require a separation step prior to use and hence would be economically advantageous.

Now it has been found that by using as the (c) component an amine oxide wherein sterically blocking groups are immediately adjacent to the nitrogen-oxygen bond, a poly alpha-olefin polymer substantially lower in alkane-solubles can be made in yields which are equal to or superior to those presently obtained in the better slurry-type processes.

STATEMENT OF THE INVENTION

As shown in the attached FIGURE and Tables I, II and III, the n-hexane-soluble fraction of the polymer product can be substantially reduced by the instant invention when a sterically hindered amine oxide is used, whereas, when a previously suggested aromatic amine oxide is employed as the (c) component, the hexane-soluble yield is considerably higher.

TABLE I

Comparison of Crystalline Polypropylene Activities and n-Hexane Solubles for Different (c) Components**

| (c) | Component* | Crystalline Polypropylene activity grams/gram TiCl$_3$/hour | n-Hexane Solubles (Percent) |
|---|---|---|---|
| (1) | none | 22.2 | 4.4 |
| (2) | pyridine-N-oxide | 21.3 | 4.5 |
| (3) | quinoline-N-oxide | 19.7 | 2.9 |
| (4) | 2-methylpyridine-N-oxide | 20.4 | 3.3 |
| (5) | 3-methylpyridine-N-oxide | 20.4 | 3.9 |
| (6) | 4-methylpyridine-N-oxide | 20.2 | 4.0 |
| (7) | 2,6-lutidine-N-oxide | 21.1 | 0.98 |
| (8) | 2,2,6,6-tetramethyl-piperidine nitroxide free radical | 22.2 | 0.82 |

*(c) component amount is 0.5 millimoles for each experiment.
**(a) and (b) components for all runs were 1.2 millimoles aluminum activated TiCl$_3$ (AA TiCl$_3$) and 3 millimoles diethyl aluminum chloride. All runs were made using 40 p.s.i.g. propylene at 25° C.

TABLE II

Comparison of Crystalline Polypropylene Activities and n-Hexane Solubles for Different (c) Components**

| (c) | Component* | Crystalline Polypropylene, activity grams/gram TiCl$_3$/hour | n-Hexane Solubles (Percent) |
|---|---|---|---|
| (1) | none | 31.3 | 8.5 |
| (2) | pyridine-N-oxide | 25.8 | 8.0 |
| (3) | 2-methylpyridine-N-oxide | 27.0 | 7.1 |
| (4) | 2,6-lutidine-N-oxide | 22.0 | 4.4 |

*(c) component amount is 0.066 millimoles for each experiment.
**(a) and (b) components for all runs were 1.2 millimoles aluminum activated TiCl$_3$ (AA TiCl$_3$) and 3 millimoles diethyl aluminum chloride. All runs were made using 40 p.s.i.g. propylene at 75° C.

TABLE III

Comparison of Crystalline Polypropylene Activities and n-Hexane Solubles for Different (c) Components**

| (c) | Component* | Crystalline Polypropylene, activity grams/gram TiCl$_3$/hour | n-Hexane Solubles (Percent) |
|---|---|---|---|
| (1) | none | 150 | 31.5 |
| (2) | pyridine-N-oxide | 114 | 22.6 |
| (3) | quinoline-N-oxide | 100.5 | 24.3 |
| (4) | 2-methylpyridine-N-oxide | 104 | 19.2 |
| (5) | 3-methylpyridine-N-oxide | 108 | 20.0 |
| (6) | 4-methylpyridine-N-oxide | 108 | 19.3 |
| (7) | 2,6-lutidine-N-oxide | 25.5 | 5.8 |
| (8) | 2,2,6,6-tetramethyl-piperidine nitroxide free radical | 130 | 18.4 |

*(c) component amount is 0.2 millimoles for each experiment.
**(a) and (b) components for all runs were 0.6 millimoles aluminum activated TiCl$_3$ (AA TiCl$_3$) and 0.8 millimoles of triethyl aluminum and 1.0 millimoles of diethyl aluminum chloride. All runs were made at 40 p.s.i.g. and 70° C.

The (a) components useful for the herein described invention are lower alkyl derivatives and more specifically are trialkyl aluminum compounds or mixtures thereof with dialkyl aluminum halides or alkyl aluminum dihalides, dialkyl aluminum halides or mixtures thereof with alkyl aluminum dihalides. More preferably, the (a) component is triethyl aluminum or mixtures thereof with diethyl aluminum chloride or ethyl aluminum dichloride, diethyl aluminum chloride or mixtures thereof with ethyl aluminum dichloride. Most preferably, triethyl aluminum, diethyl aluminum chloride or mixtures of triethyl aluminum and diethyl aluminum chloride are used. The amount of (a) component used for polymerization is based upon the reactor size, the amount of (b) component used and the amount of olefin to be polymerized as is well known to one skilled in the art.

When a mixture of trialkyl aluminum and dialkyl aluminum halide is used, useful results are obtained in the range about 65 to about 35 mole percent trialkyl compound and about 35 to about 65 mole percent dialkyl compound. When a mixture of trialkyl aluminum and alkyl aluminum dihalide is used, useful results are obtained in the range about 30 to about 50 mole percent trialkyl aluminum and about 70 to about 30 mole percent alkyl aluminum halide.

More preferably, mixtures of triethyl aluminum and diethyl aluminum chloride, or triethyl aluminum and ethyl aluminum dichloride in the concentration ranges given in the preceding paragraph are used.

Most preferably, the concentration range of the mixture of triethyl aluminum and diethyl aluminum chloride mixture is about 40 to about 47 mole percent of the triethyl compound and about 60 to about 53 mole percent of diethyl aluminum chloride.

The (b) components useful herein are halides of metals from Groups IV B to VI B, inclusive, of the Periodic Table. More preferably, the (b) component is the trichloride of titanium, vanadium, chromium, molybdenum, tungsten or zirconium tetrachloride and, most preferably, the (b) component is activated titanium trichloride. The amount of the (b) component used is based upon the amount and composition of the particular polymer to be made and is well known to one skilled in the art.

The (c) component is usefully selected from the class consisting of aromatic amine oxides of from 1–3 aromatic rings, each ring having from 0–1 nitrogen atoms, which are alpha-substituted by isopropyl, sec-butyl or t-butyl groups, aromatic amine oxides of from 1–3 aromatic rings, each ring having from 0–1 nitrogen atoms, which are alpha, alpha'-disubstituted by alkyl groups having from 1–3 carbon atoms, 2,2,6,6-tetramethylpiperidine nitroxide free radical, and a mixture of an aromatic amine oxide which is alpha, alpha'-disubstituted by alkyl groups having from 1–3 carbon atoms and 2,2,6,6-tetramethylpiperidine nitroxide free radical. More preferably, the (c) component is selected from the class consisting of aromatic amine oxides containing a single six-membered ring which is alpha, alpha'-disubstituted by alkyl groups having from 1–3 carbon atoms, 2,2,6,6-tetramethylpiperidine nitroxide free radical, and a mixture of 2,6-lutidine-N-oxide with 2,2,6,6-tetramethylpiperidine nitroxide free radical. Most preferably, the (c) component is 2,6-lutidine-N-oxide.

The amount of (c) component depends upon the amount of (a) component to be used. Too little of the (c) component increases the yield of low-molecular-weight and amorphous polymers and too much slows down the rate of polymerization. In general, the (c) component can vary from about 2 mole percent of the diethyl aluminum chloride concentration to about 8 mole percent of the diethyl component. Most preferably, the (c) component varies from about 2 mole percent of the diethyl aluminum chloride concentration to about 5 mole percent of the diethyl component. When the (a) component is a $Et_3Al$—$Et_2AlCl$ mixture, the (c) component usefully varies from about 5 mole percent of the mixture to about 15 mole percent of the mixture. Most preferably, the (c) component runs from about 9 mole percent of $Et_3Al$—$Et_2AlCl$ concentration to about 11 mole percent of $Et_3Al$—$Et_2AlCl$ concentration.

When the (c) component is a mixture of 2,6-lutidine-N-oxide and 2,2,6,6-tetramethylpiperidine nitroxide free radical, the useful range is from about 0 mole percent of the former to about 100 mole percent of the latter to about 100 mole percent of the former to about 0 mole percent of the latter. Most preferably, the range is from about 40–60 mole percent of the lutidine derivative to about 60–40 mole percent of the piperidine derivative.

As is obvious to one skilled in the art, precautions should be taken to avoid oxygen and moisture contamination of the catalyst during its preparation and its transfer. Catalyst preparation should be carried out under an inert atmosphere using such gases as argon, nitrogen, helium etc. Normally, during use no precautions need be taken as a positive pressure of monomer gas exists within the reactor.

The temperature at which the catalyst may be used is not critical in the solution process and depends, in general, upon the particular (a) and (b) components which are used. However, at temperatures below 0° C. the rate of polymerization slows down and reactor residence times become unreasonably long whereas at temperatures about 120° C., polymerization rates become too high and a loss of polymer crystallinity is found. More preferably, the temperature range in which the catalyst can be used is about 2° to about 95° C. Most preferably, the temperature range is about 50° to about 80° C.

The herein described catalyst system has also proved to be highly stereospecific during the solventless (bulk) polymerization of alpha-olefins and polymerizations wherein the olefin monomer is essentially all in the vapor phase.

The process of the invention can be carried out at atmospheric pressure or above atmospheric pressure. Pressures up to about 20,000 p.s.i.g. or higher can be used. A particular advantage of the invention is that pressures of the order of 30 to 1000 p.s.i.g. give excellent results. When the slurry technique or the bulk phase technique is used, the pressure employed need only be sufficient to maintain the reaction mixture in liquid form during the course of the polymerization.

The organic liquid employed as solvent can be alkanes or cycloalkanes such as pentane, hexane, heptane or cyclohexane, or a hydrogenated aromatic compound such as tetrahydronapthalene or decahydronapthalene, or a high-molecular-weight liquid paraffin or mixture of paraffins which are liquid at the reaction temperature, or an aromatic hydrocarbon such as benzene, toluene or xylene, or a halogenated aromatic compound such as chlorobenzene, chloronapthalene or ortho-dichlorobenzene. The nature of the solvent is subject to considerable variation, although the solvent empoyed should be liquid under the conditions of reaction and relatively inert. Hydrocarbon liquids are desirably employed. Other solvents which can be used include ethylbenzene, isopropylbenzene, ethyltoluene, n-propylbenzene, diethylbenzenes, mono- and dialkyl-napthalenes, n-pentane, n-octane, isooctane, methylcyclohexane, Tetralin and Decalin. The solvents employed in practicing this invention can be advantageously purified prior to use in the polymerization reaction by contacting the solvent, for example, in a distillation procedure or otherwise, with the polymerization catalyst to remove undesirable trace impurities. Also, prior to such purification of the diluent the catalyst can be contacted advantageously with polymerizable alpha-olefin.

The polymerization time is not critical and will usually be of the order of from 30 minutes to several hours in batch processes. Contact times of from 1 to 4 hours are commonly employed in autoclave-type reactions. When a continuous process is employed, the contact time in the polymerization zone can be regulated as desired, and in some cases it is not necessary to employ reaction or contact times much beyond ½ to 1 hour since a recycle system can be employed by precipitation of the polymer and return of the solvent and excess monomer to the charging zone wherein the catalyst can be replenished and additional monomer introduced.

The invention is of particular importance in the preparation of highly-crystalline polypropylene, although it can be used for polymerizing polystyrene and ethylene and also for preparing pure-block and terminal-block types of copolymers of ethylene and propylene or other co-alpha-olefin monomers. The pure-block copolymers may be composed of two different blocks or may be of the types ABAB etc. or ABCABC etc. Other alpha-olefins useful in this invention contain up to 10 carbon atoms and normally are free from branching in the 2-position.

The process and catalyst of the invention are normally used with a substance to control molecular weight such as dialkyl zinc compounds or hydrogen, preferably hydrogen. Solid polymers having molecular weights greater than about 50,000 and less than about 5,000,000 results thereby. The amount of hydrogen to be used depends upon the molecular weight distribution to be obtained and is well known to those skilled in the art.

The polyolefins prepared in accordance with the invention can be extruded, mechanically melted, cast or molded as desired. They can be used to form plates, sheets, films, or a variety of molded objects which exhibit a higher degree of stiffness than do the corresponding high-pressure polyolefins. The products can be extruded in the form of pipe or tubing of excellent rigidity and can be injection molded into a great variety of articles. The polymers can also be cold drawn into ribbons, bands, fibres or filaments of high elasticity and rigidity. Fibres of high strength can be spun from the molten polyolefins obtained according to this process.

The invention is illustrated by, but not limited to, the following Examples:

GENERAL EXPERIMENTAL PROCEDURE

The components of the catalyst system are charged into a pressure bottle containing 190 milliliters of n-hexane. This is effected in a dry box under a nitrogen atmosphere. Then, the pressure bottle is tightly capped and its contents are allowed to react with propylene at 40 p.s.i.g. and the reaction temperature for 1–4 hours. The resulting reaction product is treated with methanol and n-hexane. The n-hexane insoluble fraction is characterized as crystalline polypropylene. The n-hexane insoluble and n-hexane solubles percentages were obtained by adding 50 milliliters of n-hexane to the reaction product slurry along with 10 milliliters of methanol and stirring for 1 hour. The mixture was then filtered and washed with about 100 milliliters of n-hexane and enough methanol to remove any catalyst residues from the insoluble polymer. The insoluble part was then dried at 90° C. for 1 hour and weighed. The filtrate was evaporated to dryness and the residue weight was taken as the non-crystalline yield.

Aluminum activated $TiCl_3$ was used in all the following runs.

EXAMPLE I

| Catalyst System: 5.0 millimoles $Et_3Al$, 2.5 millimoles $AATiCl_3$, 25° C. | | | |
|---|---|---|---|
| Amine Oxide | | Crystalline Polypropylene Activity | n-Hexane Solubles |
| Type | Amount | grams/gram $TiCl_3$/hour | (Percent) |
| 2,6-lutidine-N-oxide* | 2 millimoles | 27.5 | 13.2 |
| LNO | 3 millimoles | 14 | 5.7 |
| — | 0 | 26 | 32.7 |

*Designated LNO

EXAMPLE II

| Catalyst System: $Et_3Al$, $EtAlCl_2$ in a 2:3 mole ratio, 70° C., 4 hours | | |
|---|---|---|
| Amine Oxide | Crystalline Polypropylene Activity grams/gram $TiCl_3$/hour | n-Hexane Solubles (Percent) |
| LNO + TMPNO* | 35 | — |

*2,2,6,6-tetramethylpiperidine nitroxide free radical

EXAMPLE III

This Example shows the effect of amount of polymerization solvent on the alkane-solubles and acivity.

Catalyst System: 0.8 millimoles $Et_3Al$, 1.0 millimoles $Et_2AlCl$, 0.6 millimoles $AATiCl_3$, 0.5 millimoles LNO, 70° C.

| Amount of Solvent Reaction (milliliters) | Crystalline Polypropylene, Activity grams/gram $TiCl_3$/hour | n-Hexane Solubles (Percent) |
|---|---|---|
| 190 | 35.0 | 5.8 |
| 95 | 21.7 | 8.0 |

EXAMPLE III-continued

This Example shows the effect of amount of polymerization solvent on the alkane-solubles and acivity.

Catalyst System: 0.8 millimoles $Et_3Al$, 1.0 millimoles $Et_2AlCl$, 0.6 millimoles $AATiCl_3$, 0.5 millimoles LNO, 70° C.

| Amount of Solvent Reaction (milliliters) | Crystalline Polypropylene, Activity grams/gram $TiCl_3$/hour | n-Hexane Solubles (Percent) |
| --- | --- | --- |
| 48.5 | 19.8 | 10.8 |

EXAMPLE IV

Catalyst System: 3 millimoles $Et_2AlCl$, 1.2 millimoles $AATiCl_3$ 0.5 millimoles (c) component, 70° C.

| (c) Component | Crystalline Polypropylene, Activity grams/gram $TiCl_3$/hour | n-Hexane Solubles (Percent) |
| --- | --- | --- |
| None | 22 | 6.0 |
| pyridine-N-oxide | 22 | 4.5 |
| TMPNO | 31 | 3.0 |

We claim:

1. In the process of forming highly-crystalline polypropylene or highly-crystalline terminal block or pure block copolymers of propylene with ethylene or another alpha-olefin with up to 10 carbon atoms using a catalyst comprised of (a) a dialkylaluminum halide, (b) a titanium trichloride, and (c) an amine oxide, the improvement which consists essentially of using for (c) about two to about eight mol percent, based upon the amount of said dialkylaluminum halide present, of 2,6-lutidine-n-oxide.

* * * * *

UNITED STATES PATENT OFFICE
CERTIFICATE OF CORRECTION

Patent No. 4,015,060                     Dated March 29, 1977

Inventor(s) Karayannis N. Nicholas et al.

It is certified that error appears in the above-identified patent and that said Letters Patent are hereby corrected as shown below:

Column 5, line 54, "results" should read -- result --.

Column 6, line 61, (in Example III heading) "acivity" should read -- activity --.

Column 7, line 3, (in Example III continued heading) "acivity" should -- activity --.

Signed and Sealed this twelfth Day of July 1977

[SEAL]

*Attest:*

RUTH C. MASON
*Attesting Officer*

C. MARSHALL DANN
*Commissioner of Patents and Trademarks*